US012695668B2

(12) United States Patent
Bhangu et al.

(10) Patent No.: US 12,695,668 B2
(45) Date of Patent: Jul. 28, 2026

(54) O-CLOUD NODE SHUTDOWN MANAGEMENT

(71) Applicants: RAKUTEN SYMPHONY, INC., Tokyo (JP); RAKUTEN MOBILE, INC., Tokyo (JP)

(72) Inventors: Manmeet Singh Bhangu, Bangalore (IN); Pankaj Tanaji Shete, Tokyo (JP)

(73) Assignees: RAKUTEN SYMPHONY, INC., Tokyo (JP); Rakuten Mobile, Inc., Tokyo (JP)

( * ) Notice: Subject to any disclaimer, the term of this patent is extended or adjusted under 35 U.S.C. 154(b) by 0 days.

(21) Appl. No.: 18/694,146

(22) PCT Filed: Jan. 12, 2024

(86) PCT No.: PCT/US2024/012304
§ 371 (c)(1),
(2) Date: Mar. 21, 2024

(87) PCT Pub. No.: WO2024/196464
PCT Pub. Date: Sep. 26, 2024

(65) Prior Publication Data
US 2025/0247298 A1     Jul. 31, 2025

(30) Foreign Application Priority Data
Mar. 17, 2023     (IN) .............................. 202341018169

(51) Int. Cl.
*H04L 41/0897*     (2022.01)
*H04L 41/0833*     (2022.01)
(Continued)

(52) U.S. Cl.
CPC ...... *H04L 41/0897* (2022.05); *H04L 41/0833* (2013.01); *H04L 41/16* (2013.01); *H04W 24/02* (2013.01)

(58) Field of Classification Search
None
See application file for complete search history.

(56) References Cited

U.S. PATENT DOCUMENTS 9,489,647 B2 * 11/2016 Martinez ................... G06F 8/36
9,762,616 B2 * 9/2017 Nagaratnam ....... H04L 63/0254
(Continued)

OTHER PUBLICATIONS

Mavenir, Intel, A Holistic Study of Power Consumption and Energy Savings Strategies for Open vRAN Systems, white paper, Feb. 24, 2023, pp. 1-45. (Year: 2023).*
(Continued)

*Primary Examiner* — Ranodhi Serrao
(74) *Attorney, Agent, or Firm* — Sughrue Mion, PLLC

(57) ABSTRACT

Provided are a method, system, and device for shutting down an identified Open Radio Access Network (O-RAN) Cloud (O-Cloud) node. The method may include: receiving, by a Federated O-Cloud Orchestration and Management (FOCOM), a recommendation from an rApp to shutdown an identified O-Cloud node; sending, by the FOCOM, an instruction to a Network Function Orchestrator (NFO) to relocate a workload from the identified O-Cloud node to alternative O-Cloud node based on the recommendation; and sending, by the FOCOM, an instruction to Infrastructure Management Services (IMS) to shutdown the identified O-Cloud node.

20 Claims, 5 Drawing Sheets

(51) Int. Cl.
    *H04L 41/16*        (2022.01)
    *H04W 24/02*      (2009.01)

(56)               References Cited

U.S. PATENT DOCUMENTS

| 9,871,822 | B2 * | 1/2018 | Nagaratnam | H04L 47/83 |
| 10,411,975 | B2 * | 9/2019 | Martinez | H04L 41/40 |
| 10,673,900 | B2 * | 6/2020 | Nagaratnam | H04L 63/20 |
| 10,880,189 | B2 * | 12/2020 | Martinez | H04L 67/10 |
| 11,711,267 | B2 * | 7/2023 | Parker | H04L 41/40 |
| | | | | 709/223 |
| 2016/0321572 | A9 * | 11/2016 | Martinez | H04L 67/10 |
| 2017/0126787 | A1 * | 5/2017 | Martinez | G06Q 10/06 |
| 2020/0195495 | A1 * | 6/2020 | Parker | H04L 41/40 |
| 2024/0106709 | A1 * | 3/2024 | Shete | H04L 41/0895 |
| 2024/0107442 | A1 * | 3/2024 | Luthra | H04L 41/0816 |

OTHER PUBLICATIONS

Mavenir, Intel, "A Holistic Study of Power Consumption and Energy Savings Strategies for Open vRAN Systems", White Paper, Feb. 2023, pp. 1-45 (45 pages total).

"O-RAN Working Group 6 (Cloudification and Orchestration Workgroup), Study on O-Cloud Energy Savings", O-RAN.WG6.O-Cloud Energy Savings.v01.00, Technical Report, 2022, pp. 1-29.

* cited by examiner

300

FOCOM RECEIVES RECOMMENDATION FROM RAPP TO SHUTDOWN IDENTIFIED O-CLOUD NODE
(301)

FOCOM SENDS INSTRUCTION TO NFO TO RELOCATE WORKLOAD FROM IDENTIFIED O-CLOUD NODE TO ALTERNATIVE O-CLOUD NODE BASED ON RECOMMENDATION FROM RAPP
(302)

FOCOM SENDS INSTRUCTION TO IMS TO SHUTDOWN IDENTIFIED O-CLOUD NODE
(303)

O-CLOUD NODE SHUTDOWN MANAGEMENT

CROSS REFERENCE TO RELATED APPLICATIONS

This application is a National Stage of International Application No. PCT/US2024/012304 filed Jan. 22, 2024, claiming priority based on Indian Patent Application No. 202341018169 filed Mar. 17, 2023.

FIELD

System and methods consistent with example embodiments of the present disclosure relate to managing open radio access network (O-RAN) cloud (O-Cloud) node shutdown.

BACKGROUND

A radio access network (RAN) is an important component in a telecommunications system, as it connects end-user devices (or user equipment) to other parts of the network. The RAN includes a combination of various network elements (NEs) that connect the end-user devices to a core network. Traditionally, the hardware and/or software of a particular RAN is vendor-specific.

Open RAN (O-RAN) technology has emerged to enable multiple vendors to provide hardware and/or software to a telecommunications system. To this end, O-RAN disaggregates the RAN functions into a centralized unit (CU), a distributed unit (DU), and a radio unit (RU). The CU is a logical Node for hosting Radio Resource Control (RRC), Service Data Adaptation Protocol (SDAP), and/or Packet Data Convergence Protocol (PDCP) sublayers of the RAN. The DU is a logical Node hosting Radio Link Control (RLC), Media Access Control (MAC), and Physical (PHY) sublayers of the RAN. The RU is a physical Node that converts radio signals from antennas to digital signals that can be transmitted over the FrontHaul to a DU. Because these entities have open protocols and interfaces between them, they can be developed by different vendors.

FIG. 1 illustrates a related art O-RAN architecture. Referring to FIG. 1, RAN functions in the O-RAN architecture are controlled and optimized by an RIC. The RIC is a software-defined component that implements modular applications to facilitate the multivendor operability required in the O-RAN system, as well as to automate and optimize RAN operations. The RIC is divided into two types: a non-real-time RIC (Non-RT RIC) and a near-real-time RIC (Near-RT RIC).

The Non-RT RIC is the control point of a non-real-time control loop and operates on a timescale greater than 1 second within the Service Management and Orchestration (SMO) framework. Its functionalities are implemented through modular applications called rApps (rApp 1, . . . , rApp N), and include: providing policy-based guidance and enrichment across the A1 interface, which is the interface that enables communication between the Non-RT RIC and the Near-RT RIC; performing data analytics; Artificial Intelligence/Machine Learning (AI/ML) training and inference for RAN optimization; and/or recommending configuration management actions over the O1 interface, which is the interface that connects the SMO to RAN managed elements (e.g., Near-RT RIC, O-RAN centralized Unit (O-CU), O-RAN Distributed Unit (O-DU), etc.).

The Near-RT RIC operates on a timescale between 10 milliseconds and 1 second and connects to the O-DU, O-CU (disaggregated into the O-CU control plane (O-CU-CP) and the O-CU user plane (O-CU-UP)), and an open evolved NodeB (O-eNB) via the E2 interface. The Near-RT RIC uses the E2 interface to control the underlying RAN elements (E2 Nodes/network functions (NFs)) over a near-real-time control loop. The Near-RT RIC monitors, suspends/stops, overrides, and controls the E2 Nodes (O-CU, O-DU, and O-eNB) via policies. For example, the Near-RT sets policy parameters on activated functions of the E2 Nodes. Further, the Near-RT RIC hosts xApps to implement functions such as quality of service (QOS) optimization, mobility optimization, slicing optimization, interference mitigation, load balancing, security, etc. The two types of RICs work together to optimize the O-RAN. For example, the Non-RT RIC provides, over the A1 interface, the policies, data, and AI/ML models enforced and used by the Near-RT RIC for RAN optimization, and the Near-RT returns policy feedback (i.e., how the policy set by the NON-RT RIC works).

The SMO framework, within which the Non-RT RIC is located, manages and orchestrates RAN elements. Specifically, the SMO includes the Federated O-Cloud Orchestration and Management (FOCOM), a Network Function Orchestrator (NFO) that manages Virtual Machines (VM) based Virtual Network Functions (VNF) and container (i.e., instance) based VNF, and the OAM as a part of the SMO that manages and orchestrates what is referred to as the O-RAN Cloud (O-Cloud). The O-Cloud is a collection of physical RAN Nodes that host the RICs, O-CUs, and O-DUs, the supporting software components (e.g., the operating systems and runtime environments), and the SMO itself. In other words, the SMO manages the O-Cloud from within. The O2 interface is the interface between the SMO and the O-Cloud it resides in. Through the O2 interface, the SMO provides Infrastructure Management Services (IMS) and Deployment Management Services (DMS). The O2 interface may also send O2 telemetry data to the SMO, e.g., O-Cloud configuration or any logical function data, energy consumption, health status of Node, etc.

SUMMARY

In the related art, VNF's may be implemented as single or chains of VM's or containers, which are deployed within data centers on commodity hardware. In order to achieve cost efficiency, it is typically desirable to minimize the power consumption of Network Function Virtualization (NFV) infrastructure. In the related art, this may be accomplished by using the minimum set of physical servers required by the VNF's in terms of computing, memory, and disk-related parameters. Accordingly, by shutting down resources that are not utilized and keeping network capacity at an optimal level, network energy consumption can be optimized in line with network traffic load. When an O-Cloud is operating at a low load, the deployed NF or its microservices can be relocated in order to shut down the idle O-Cloud nodes.

In the related art for O-RAN architecture, managing O-Cloud resources (either physical or logical), such as shutting down O-Cloud nodes is orchestrated by the FOCOM with the help of the IMS. To this end, the FOCOM may communicate with the IMS over the O2 interface. Thus, it may be desirable to use recommendations (such as from a rApp) to manage shutting down an O-Cloud node to optimize network capacity based on energy consumption and other factors.

However, there may arise a scenario where workloads that are currently running on an O-Cloud node need to be migrated to an alternate node before shutting down the O-Cloud node. Accordingly, there is a need for coordination between the FOCOM and the NFO to facilitate shutting down the O-Cloud node and may also include migrating the workloads.

Example embodiments of the present disclosure provide a method and system for shutting down an identified Open Radio Access Network (O-RAN) Cloud (O-Cloud) node. In particular, it may include receiving by a Federated O-Cloud Orchestration and Management (FOCOM), a recommendation from a rApp to shutdown an identified O-Cloud node; sending, by the FOCOM, an instruction to a Network Function Orchestrator (NFO) to relocate a workload from the identified O-Cloud node to alternative O-Cloud node based on the recommendation; and sending, by the FOCOM, an instruction to Infrastructure Management Services (IMS) to shutdown the identified O-Cloud node. Accordingly, since the FOCOM can facilitate communicate with the NFO based on a recommendation from a rApp to shutdown an identified O-Cloud node, network energy and efficiency can be optimized, and operating costs may also be reduced.

According to embodiments, a Federated O-Cloud Orchestration and Management (FOCOM) may be provided, and be configured to: receive a recommendation from an rApp to shutdown an identified O-Cloud node; send an instruction to a Network Function Orchestrator (NFO) to relocate a workload from the identified O-Cloud node to alternative O-Cloud node based on the recommendation; and send an instruction to Infrastructure Management Services (IMS) to shutdown the identified O-Cloud node.

According to embodiments, a non-transitory computer-readable recording medium may be provided, the non-transitory computer-readable recording medium having recorded thereon instructions to perform a method including: receiving, by a Federated O-Cloud Orchestration and Management (FOCOM), a recommendation from an rApp to shutdown an identified O-Cloud node; sending, by the FOCOM, an instruction to a Network Function Orchestrator (NFO) to relocate a workload from the identified O-Cloud node to alternative O-Cloud node based on the recommendation; and sending, by the FOCOM, an instruction to Infrastructure Management Services (IMS) to shutdown the identified O-Cloud node.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects, and advantages of certain exemplary embodiments of the disclosure will be described below with reference to the accompanying drawings, in which like reference numerals denote like elements, and wherein.

DETAILED DESCRIPTION

Figure 1:
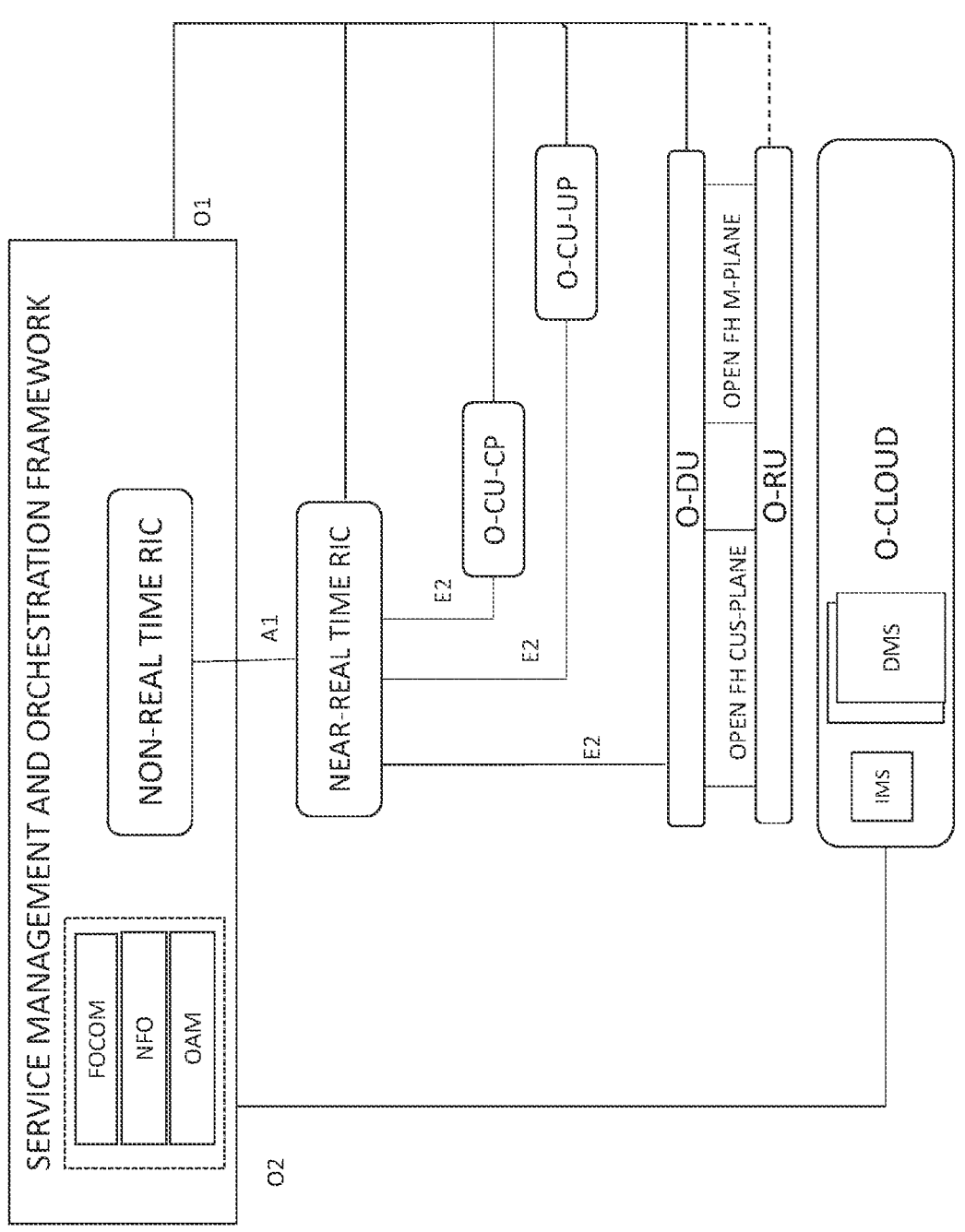
FIG. 1 illustrates an O-RAN architecture according to the related art.

The following detailed description of example embodiments refers to the accompanying drawings. The same reference numbers in different drawings may identify the same or similar elements.

The foregoing disclosure provides illustration and description but is not intended to be exhaustive or to limit the implementations to the precise form disclosed. Modifications and variations are possible in light of the above disclosure or may be acquired from the practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limited to the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments are directed to O-Cloud resource optimization, which is a process of utilizing O-Cloud resources in an efficient manner and eliminating waste of O-Cloud resources by selecting, provisioning, and rightsizing the resources within the O-Cloud. In accordance with example embodiments, Network Functions (NFs) within the O-Cloud are orchestrated as VNFs/CNFs. The SMO (NFO, FOCOM) handles the management and orchestration of VNFs/CNFs and underlying O-Cloud infrastructure. The SMO's management, orchestration, and optimization functionalities can be enhanced in accordance with example embodiments by intelligent observability analysis from VNFs/CNFs and O-Cloud.

The Non-RT RIC hosts third-party applications such as rApps in the SMO, which can collect and read various O1 and O2-related observability data and metrics through O1 and O2-related services. These third-party rApps can be leveraged in example embodiments to provide guidance and/or recommendations to the NFO and FOCOM for management, orchestration, and optimization of VNFs/CNFs and underlying O-Cloud infrastructure.

Example embodiments of the present disclosure provide a method and system for the FOCOM to facilitate communication with an NFO to shutdown an identified O-Cloud node based on a recommendation from an rApp. In particular, it may include receiving by the FOCOM, a recommendation from a rApp to shutdown an identified O-Cloud node; sending, by the FOCOM, an instruction to the NFO to relocate a workload from the identified O-Cloud node to alternative O-Cloud node based on the recommendation; and sending, by the FOCOM, an instruction to Infrastructure Management Services (IMS) to shutdown the identified O-Cloud node. Accordingly, since the FOCOM can facilitate communication with the NFO based on a recommendation from a rApp to shutdown an identified O-Cloud node, network energy and efficiency can be optimized, and operating costs may also be reduced.

Figure 2:
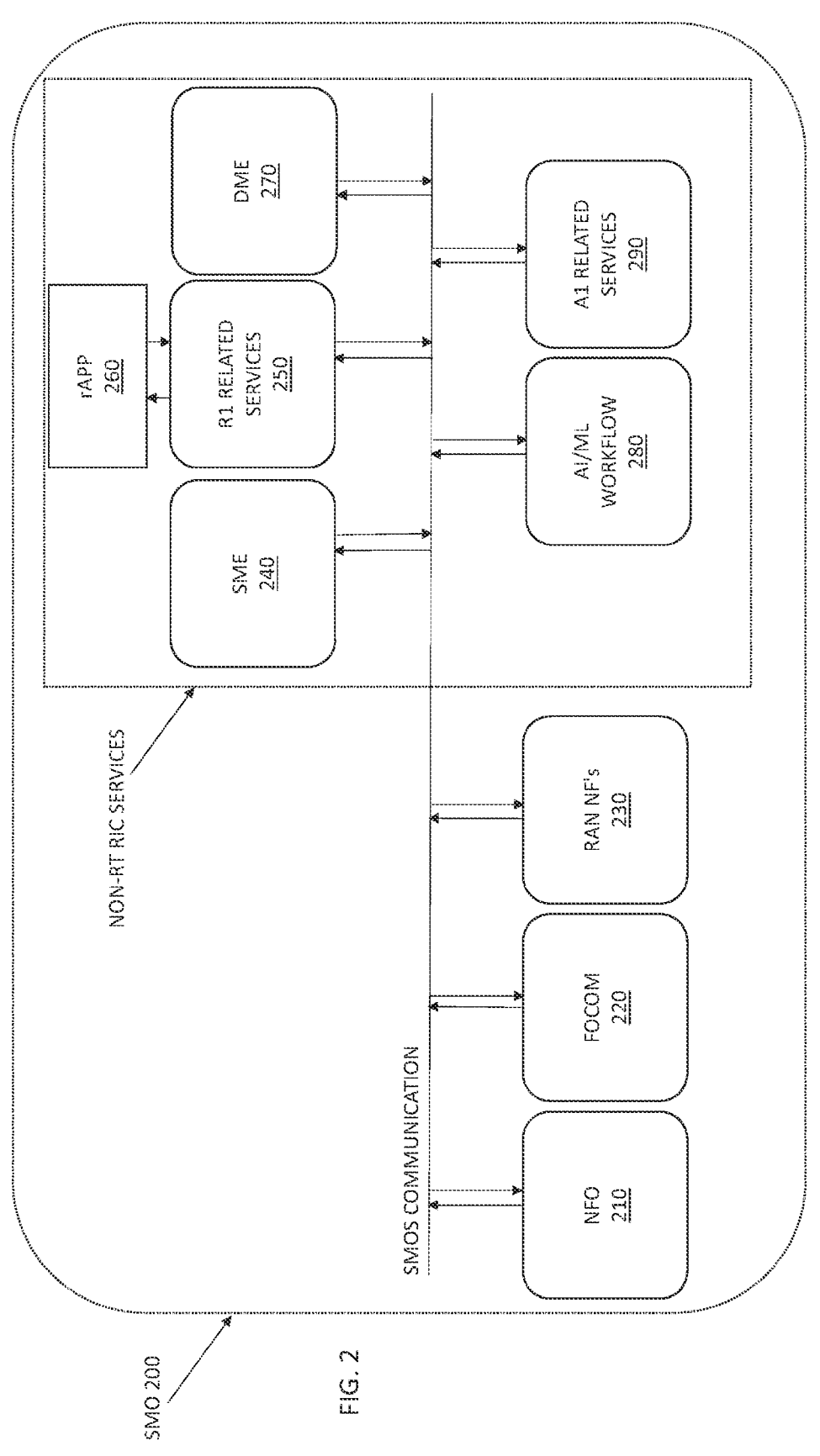
FIG. 2 illustrates a system architecture for SMO services according to an embodiment.

FIG. 2 illustrates a block diagram for a system architecture SMO services (SMOS) according to an embodiment. In particular, SMO 200 may comprise services (SMOS) that may communicate with each other via a communication interface (labeled as SMOS communication in FIG. 2).

NFO 210 and FOCOM 220 may be in communication with O-Cloud services (not illustrated) via an O2 interface.

RAN NF 230 may consist of one or more RAN NF OAM services, which may implement functions responsible for Operations, Administration, Maintenance (OAM).

Service Management and Exposure (SME) 240, R1 Related Services 250, rApps 260, Data Management and Exposure (DME) 270, AI/ML workflow 280, and A1-related services 290 may be services that operate in Non-RT RIC.

According to some embodiments, the rApps 260 may be able to communicate with the SME 240 over the R1 interface to obtain information about FOCOM/DMS/O1 services and endpoints. According to some embodiments, the rApps 260 may also be able to communicate with the DME 270 to obtain information about the data types which are supported by the FOCOM/DMS/O1 services.

According to some embodiments, the FOCOM 220 may be able to communicate with the SME 240 to discover NFO services and end points. According to some embodiments, the FOCOM 220 may be able to communicate with the DME 270 to discover NFO-supported data types.

According to some embodiments, the NFO 210 may be able to communicate with the SME 240 to discover RAN OAM services. According to some embodiments, the NFO 210 may be able to communicate with the DME 270 to discover OAM-supported data types.

rApps 260 may also subscribe to O1 and O2-related data. In particular, rApps 260 may subscribe to O1-related data from OAM services (e.g., RAN NF 230), and O2-related data from FOCOM 220 and the DMS. This data may be used in order to collect information on traffic patterns and resource usage of O-Cloud nodes. This may be done, for example, by using metrics in the O-Cloud system or VM metrics, or by monitoring. Nevertheless, it should be appreciated by a person skilled in the art that other methods of data collection can be utilized depending on the specific implementation. Such information may be collected from the O-Cloud by the IMS and DMS and sent northbound using at least one of O2ims or O2dms interfaces. That is, the FOCOM 220 may implement using an O2ims API and the DMS may implement using an O2dms API Accordingly, rApps 260 may be able to collect and store data on traffic patterns and resource usage (e.g., CPU, memory, network, etc.) based on the O1 and O2-related data for the O-Cloud nodes. According to some embodiments, the stored data may be analyzed using machine learning (ML) and/or artificial intelligence (AI) techniques in order to analyze the collected data, and accordingly identify patterns in the traffic and resource usage of O-cloud nodes. Based on the analysis, an ML model may be trained in order to predict future traffic patterns and resource usage based on the O1 and O2-related data. Accordingly, the trained ML model may be used to identify idle times and resources that are not being utilized. It is contemplated that the ML/AI techniques may be implemented using AI/ML workflow 280 according to some implementations, nevertheless, the specific method to implement training an ML model is not specifically limited thereto.

Based on the rApps 260 usage of the trained ML model, the rApp 260 may be configured to recommend O-cloud node shutdown to FOCOM 220. It should also be appreciated that after recommending node shutdown, the rApp 260 may continuously monitor and update the ML model in order to ensure that future recommendations are also accurate.

Figure 3:
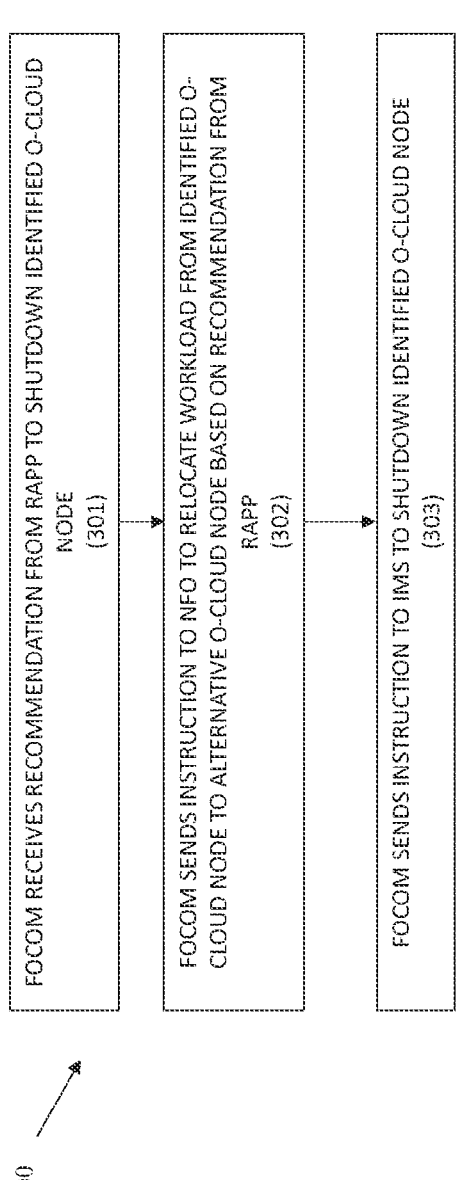
FIG. 3 illustrates a flowchart of a method for shutting down an O-Cloud node and relocating a workload according to an embodiment.

FIG. 3 illustrates a flowchart of a method 300 for shutting down an O-Cloud node and relocating a workload according to an embodiment.

In operation 301, the FOCOM (e.g., FOCOM 220) may receive a recommendation from a rApp (e.g., rApp 260) to shutdown an identified O-Cloud node. This may be an O-Cloud node that has been determined by the rApp, based on a trained ML model, to be idle, or that shutting down the identified O-Cloud node would improve the efficiency of the network.

According to some embodiments, after receiving the recommendation, the FOCOM may communicate with the SME (e.g., SME 240) and DME (e.g., SME 270) to discover NFO services endpoints and supported data types.

According to some embodiments, after receiving the recommendation, the NFO (e.g., NFO 210) may communicate with Topology Exposure and Inventory Management SMOS to get topology and inventory information, in order to determine workload placement. Similarly, the rApp may also communicate with the Topology Exposure and Inventory Management SMOS and recommend workload placement to the NFO according to some embodiments.

In operation 302, the FOCOM may send an instruction to the NFO to relocate a workload to an alternative O-Cloud node. This may only be performed if there is a workload running on the identified O-Cloud node, according to embodiments. Upon receiving the instruction, the NFO may check the availability of an alternative O-Cloud Node, and thereby orchestrate migration of the workload using a DMS. However, if the NFO is unable to find a suitable Node, it may return an error message to the FOCOM, which may indicate that there is no suitable workload available, according to some embodiments.

According to some embodiments, upon receiving the instruction from the FOCOM, the NFO may communicate with the SME to discover RAN OAM services and communicate with the DME to discover OAM-supported data types.

According to some embodiments, after receiving the instruction from the FOCOM, the NFO may send an instruction to the OAM (e.g., RAN NF 230) to drain all the traffic from the identified O-Cloud node and move the traffic to the alternative O-Cloud node. After performing the migration, the OAM may send confirmation to the NFO that traffic has been successfully migrated.

In operation 303, the FOCOM may instruct the IMS to shutdown the node. This may be performed over the O2ims interface according to embodiments. Operation 303 may be performed after it has received confirmation from the NFO of successful traffic migration. Specifically, after the DMS has migrated the workload, it may send a confirmation (e.g., a confirmation message) to the NFO, which in turn may send confirmation to the FOCOM. As previously mentioned, even after the identified O-Cloud node has been shutdown, the rApp's may continuously monitor and update the ML model according to some embodiments.

Based on the above embodiments, it can be understood that since the FOCOM can facilitate communicate with the NFO based on a recommendation from an rApp to shutdown an identified O-Cloud node, network energy and efficiency can be optimized, and operating costs may also be reduced.

Figure 4:
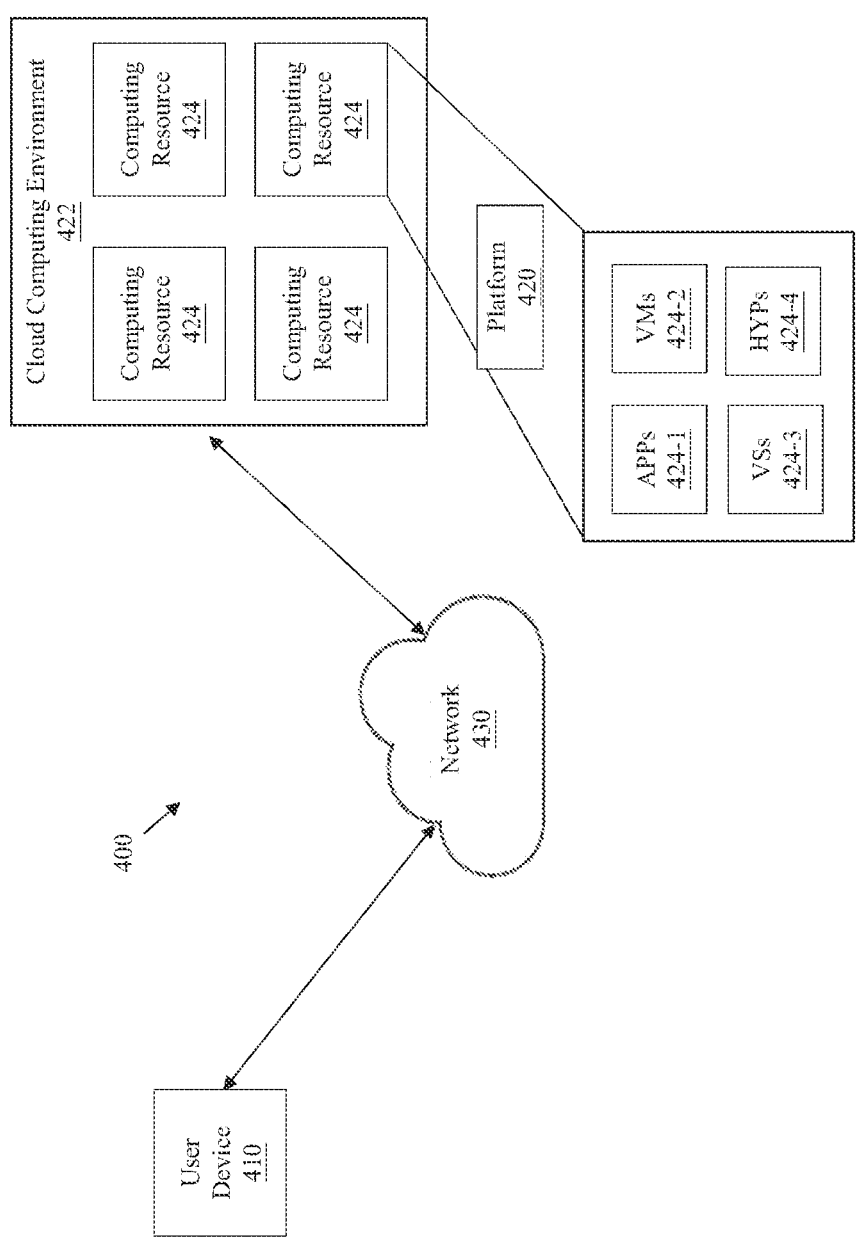
FIG. 4 illustrates a diagram of an example environment in which systems and/or methods, described herein, may be implemented.

FIG. 4 is a diagram of an example environment 400 in which systems and/or methods, described herein, may be implemented. As shown in FIG. 4, environment 400 may include a user device 410, a platform 420, and a network 430. Devices of environment 400 may interconnect via wired connections, wireless connections, or a combination of wired and wireless connections. In embodiments, any of the functions and operations described with reference to FIGS. 2 through 4 above may be performed by any combination of elements illustrated in FIG. 4.

User device 410 includes one or more devices capable of receiving, generating, storing, processing, and/or providing information associated with platform 420. For example, user device 410 may include a computing device (e.g., a desktop computer, a laptop computer, a tablet computer, a handheld computer, a smart speaker, a server, etc.), a mobile phone (e.g., a smartphone, a radiotelephone, etc.), a wearable device (e.g., a pair of smart glasses or a smart watch), or a similar device. In some implementations, user device 410 may receive information from and/or transmit information to platform 420.

Platform 420 includes one or more devices capable of receiving, generating, storing, processing, and/or providing information. In some implementations, platform 420 may include a cloud server or a group of cloud servers. In some implementations, platform 420 may be designed to be modular such that certain software components may be swapped in or out depending on a particular need. As such, platform 420 may be easily and/or quickly reconfigured for different uses.

In some implementations, as shown, platform 420 may be hosted in cloud computing environment 422. Notably, while implementations described herein describe platform 420 as being hosted in cloud computing environment 422, in some implementations, platform 420 may not be cloud-based (i.e., may be implemented outside of a cloud computing environment) or may be partially cloud-based.

Cloud computing environment 422 includes an environment that hosts platform 420. Cloud computing environment 422 may provide computation, software, data access, storage, etc., services that do not require end-user (e.g., user device 410) knowledge of a physical location and configuration of system(s) and/or device(s) that hosts platform 420. As shown, cloud computing environment 422 may include a group of computing resources 424 (referred to collectively as "computing resources 424" and individually as "computing resource 424").

Computing resource 424 includes one or more personal computers, a cluster of computing devices, workstation computers, server devices, or other types of computation and/or communication devices. In some implementations, computing resource 424 may host platform 420. The cloud resources may include compute instances executing in computing resource 424, storage devices provided in computing resource 424, data transfer devices provided by computing resource 424, etc. In some implementations, computing resource 424 may communicate with other computing resources 424 via wired connections, wireless connections, or a combination of wired and wireless connections.

As further shown in FIG. 4, computing resource 424 includes a group of cloud resources, such as one or more applications ("APPs") 424-1, one or more virtual machines ("VMs") 424-2, virtualized storage ("VSs") 424-3, one or more hypervisors ("HYPs") 424-4, or the like. While the current example embodiment is with reference to virtualized network functions, it is understood that one or more other embodiments are not limited thereto, and may be implemented in at least one of containers, cloud-native services, one or more container platforms, etc. For example, in one or more other example embodiments, any of the above-described components (e.g., nodes, E2 nodes, SMO functions, RIC, system, apparatus, etc.) may be a software-based component deployed or hosted in, for example, a server cluster such as a hybrid cloud server, data center servers, and the like. The software-based component may be containerized and may be deployed and controlled by one or more machines, called "nodes", that run or execute the containerized network elements and are addressable. In this regard, a server cluster may contain at least one master node and a plurality of worker nodes, wherein the master node(s) controls and manages a set of associated worker nodes Application 424-1 includes one or more software applications that may be provided to or accessed by user device 410. Application 424-1 may eliminate a need to install and execute the software applications on user device 410. For example, application 424-1 may include software associated with platform 420 and/or any other software capable of being provided via cloud computing environment 422. In some implementations, one application 424-1 may send/receive information to/from one or more other applications 424-1, via virtual machine 424-2.

Virtual machine 424-2 includes a software implementation of a machine (e.g., a computer) that executes programs like a physical machine. Virtual machine 424-2 may be either a system virtual machine or a process virtual machine, depending upon use and degree of correspondence to any real machine by virtual machine 424-2. A system virtual machine may provide a complete system platform that supports execution of a complete operating system ("OS"). A process virtual machine may execute a single program, and may support a single process. In some implementations, virtual machine 424-2 may execute on behalf of a user (e.g., user device 410), and may manage infrastructure of cloud computing environment 422, such as data management, synchronization, or long-duration data transfers.

Virtualized storage 424-3 includes one or more storage systems and/or one or more devices that use virtualization techniques within the storage systems or devices of computing resource 424. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 424-4 may provide hardware virtualization techniques that allow multiple operating systems (e.g., "guest operating systems") to execute concurrently on a host computer, such as computing resource 424. Hypervisor 424-4 may present a virtual operating platform to the guest operating systems, and may manage the execution of the guest operating systems. Multiple instances of a variety of operating systems may share virtualized hardware resources.

Network 430 includes one or more wired and/or wireless networks. For example, network 430 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
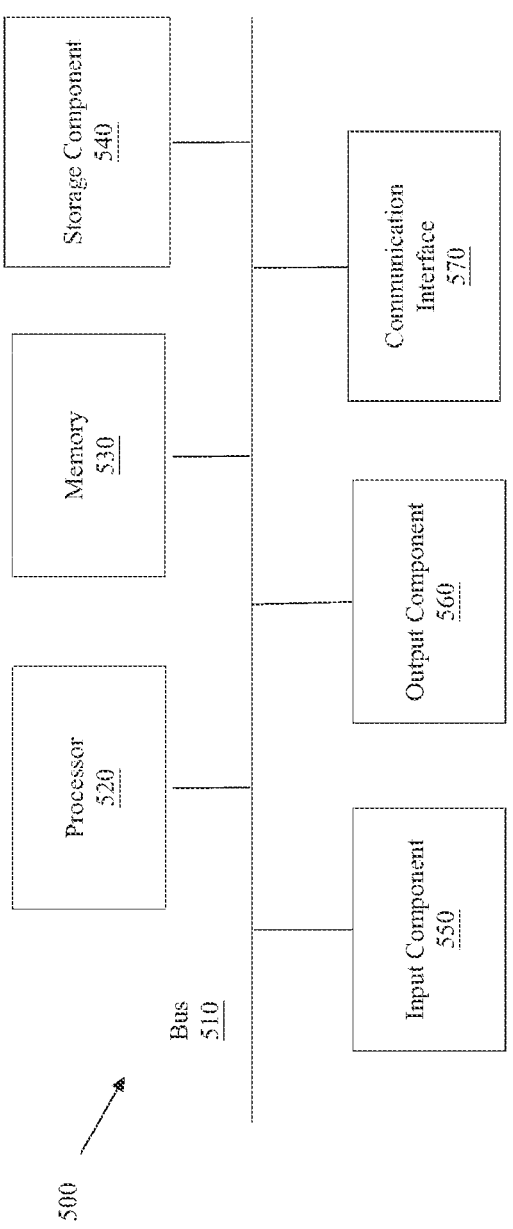
FIG. 5 illustrates a diagram of example components of a device according to an embodiment.

FIG. 5 is a diagram of example components of a device 500. Device 500 may correspond to user device 410 and/or platform 420. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 may be implemented in hardware, firmware, or a combination of hardware and software. Processor 520 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, or the like.

Device 500 may perform one or more processes described herein. Device 500 may perform these processes in response to processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

In embodiments, any of the operations or processes of FIGS. 2-3 may be implemented by or using any one of the elements illustrated in FIGS. 4 and 5. It is understood that other embodiments are not limited thereto, and may be implemented in a variety of different architectures (e.g., bare metal architecture, any cloud-based architecture or deployment architecture such as Kubernetes, Docker, OpenStack, etc.).

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

These computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Various Aspects of Embodiments

Various further respective aspects and features of embodiments of the present disclosure may be defined by the following items:

Item [1]: A method including: receiving, by a Federated O-Cloud Orchestration and Management (FOCOM), a recommendation from an rApp to shutdown an identified O-Cloud node; sending, by the FOCOM, an instruction to a Network Function Orchestrator (NFO) to relocate a workload from the identified O-Cloud node to alternative O-Cloud node based on the recommendation; and sending, by the FOCOM, an instruction to Infrastructure Management Services (IMS) to shutdown the identified O-Cloud node.

Item [2]: The method according to Item [1], wherein the rApp is subscribed to O1 related data from Operations, Administration, Maintenance (OAM) and O2 related data from the FOCOM.

Item [3]: The method according to Item [2], wherein the rApp uses a machine learning model based on collected data from the O1 related data and the O2 related data to generate the recommendation, and wherein the O1 related data and the O2 related data are related to traffic patterns and resource usage.

Item [4]: The method according to any one of Items [1]-[3]: wherein upon receiving the instruction from the FOCOM to relocate the workload, the NFO is configured to check the availability of the alternative O-Cloud node, wherein: if the NFO is able to find an alternative O-Cloud node, the NFO is configured to send an instruction to a Deployment Management Service (DMS) to migrate the workload; and if the NFO is unable to find an alternative O-Cloud node, the NFO is instead configured to send an error message to the FOCOM.

Item [5]: The method according to Item [4], wherein upon receiving the instruction from the FOCOM to relocate the workload, the NFO is configured to send an instruction to Operations, Administration, Maintenance (OAM) to drain traffic from the identified O-Cloud node.

Item [6]: The method according to Item [5], wherein the instruction to the IMS to shutdown the identified O-Cloud node is sent upon receiving confirmation from the NFO that the DMS has migrated the workload.

Item [7]: The method according to any one of Items [1]-[6], wherein the rApp, the FOCOM, and the NFO are each in communication with Service Management and Exposure (SME) and Data Management and Exposure (DME) to receive information related to at least one of services, endpoints, and supported data types.

Item [8]: A Federated O-Cloud Orchestration and Management (FOCOM) configured to: receive a recommendation from an rApp to shutdown an identified O-Cloud node;

send an instruction to a Network Function Orchestrator (NFO) to relocate a workload from the identified O-Cloud node to alternative O-Cloud node based on the recommendation; and send an instruction to Infrastructure Management Services (IMS) to shutdown the identified O-Cloud node.

Item [9]: The FOCOM according to Item [8], wherein the rApp is subscribed to O1 related data from Operations, Administration, Maintenance (OAM) and O2 related data from the FOCOM.

Item [10]: The FOCOM according to Item [9], wherein the rApp uses a machine learning model based on collected data from the O1 related data and the O2 related data to generate the recommendation, and wherein the O1 related data and the O2 related data are related to traffic patterns and resource usage.

Item [11]: The FOCOM according to any one of Items [8]-[10], wherein upon receiving the instruction from the FOCOM to relocate the workload, the NFO is configured to check the availability of the alternative O-Cloud node, wherein: if the NFO is able to find an alternative O-Cloud node, the NFO is configured to send an instruction to a Deployment Management Service (DMS) to migrate the workload; and if the NFO is unable to find an alternative O-Cloud node, the NFO is instead configured to send an error message to the FOCOM.

Item [12]: The FOCOM according to Item [11], wherein upon receiving the instruction from the FOCOM to relocate the workload, the NFO is configured to send an instruction to Operations, Administration, Maintenance (OAM) to drain traffic from the identified O-Cloud node.

Item [13]: The FOCOM according to Item [12], wherein the instruction to the IMS to shutdown the identified O-Cloud node is sent upon receiving confirmation from the NFO that the DMS has migrated the workload.

Item [14]: The FOCOM according to any one of Items [8]-[13], wherein the rApp, the FOCOM, and the NFO are each in communication with Service Management and Exposure (SME) and Data Management and Exposure (DME) to receive information related to at least one of services, endpoints, and supported data types.

Item [15]: A non-transitory computer-readable recording medium having recorded thereon instructions to perform a method including: receiving, by a Federated O-Cloud Orchestration and Management (FOCOM), a recommendation from an rApp to shutdown an identified O-Cloud node; sending, by the FOCOM, an instruction to a Network Function Orchestrator (NFO) to relocate a workload from the identified O-Cloud node to alternative O-Cloud node based on the recommendation; and sending, by the FOCOM, an instruction to Infrastructure Management Services (IMS) to shutdown the identified O-Cloud node.

Item [16]: The non-transitory computer-readable recording according to Item [15], wherein the rApp is subscribed to O1 related data from Operations, Administration, Maintenance (OAM) and O2 related data from the FOCOM.

Item [17]: The non-transitory computer-readable recording according to Item [16], wherein the rApp uses a machine learning model based on collected data from the O1 related data and the O2 related data to generate the recommendation, and wherein the O1 related data and the O2 related data are related to traffic patterns and resource usage.

Item [18]: The non-transitory computer-readable recording according to any one of Items [15]-[17], wherein upon receiving the instruction from the FOCOM to relocate the workload, the NFO is configured to check the availability of the alternative O-Cloud node, wherein: if the NFO is able to find an alternative O-Cloud node, the NFO is configured to send an instruction to a Deployment Management Service (DMS) to migrate the workload; and if the NFO is unable to find an alternative O-Cloud node, the NFO is instead configured to send an error message to the FOCOM.

Item [19]: The non-transitory computer-readable recording according to Item [18], wherein upon receiving the instruction from the FOCOM to relocate the workload, the NFO is configured to send an instruction to Operations, Administration, Maintenance (OAM) to drain traffic from the identified O-Cloud node.

Item [20]: The non-transitory computer-readable recording according to Item [19], wherein the instruction to the IMS to shutdown the identified O-Cloud node is sent upon receiving confirmation from the NFO that the DMS has migrated the workload.

It can be understood that numerous modifications and variations of the present disclosure are possible in light of the above teachings. It will be apparent that within the scope of the appended clauses, the present disclosures may be practiced otherwise than as specifically described herein.

What is claimed is:

1. A method comprising:

receiving, by a Federated O-Cloud Orchestration and Management (FOCOM), a recommendation from an rApp to shutdown an identified O-Cloud node;

sending, by the FOCOM, an instruction to a Network Function Orchestrator (NFO) to relocate a workload from the identified O-Cloud node to alternative O-Cloud node based on the recommendation; and sending, by the FOCOM, an instruction to Infrastructure Management Services (IMS) to shutdown the identified O-Cloud node.

2. The method as claimed in claim 1, wherein the rApp is subscribed to O1 related data from Operations, Administration, Maintenance (OAM) and O2 related data from the FOCOM.

3. The method as claimed in claim 2, wherein the rApp uses a machine learning model based on collected data from the O1 related data and the O2 related data to generate the recommendation, and wherein the O1 related data and the O2 related data are related to traffic patterns and resource usage.

4. The method as claimed in claim 1, wherein upon receiving the instruction from the FOCOM to relocate the workload, the NFO is configured to check the availability of the alternative O-Cloud node, wherein:

if the NFO is able to find an alternative O-Cloud node, the NFO is configured to send an instruction to a Deployment Management Service (DMS) to migrate the workload; and if the NFO is unable to find an alternative O-Cloud node, the NFO is instead configured to send an error message to the FOCOM.

5. The method as claimed in claim 4, wherein upon receiving the instruction from the FOCOM to relocate the workload, the NFO is configured to send an instruction to Operations, Administration, Maintenance (OAM) to drain traffic from the identified O-Cloud node.

6. The method as claimed in claim 5, wherein the instruction to the IMS to shutdown the identified O-Cloud node is sent upon receiving confirmation from the NFO that the DMS has migrated the workload.

7. The method as claimed in claim 1, wherein the rApp, the FOCOM, and the NFO are each in communication with Service Management and Exposure (SME) and Data Management and Exposure (DME) to receive information related to at least one of services, endpoints, and supported data types.

8. A system comprising:

a memory storing instructions; and at least one processor configured to execute the instructions to implement a Federated O-Cloud Orchestration and Management (FOCOM) configured to:

receive a recommendation from an rApp to shutdown an identified O-Cloud node;

send an instruction to a Network Function Orchestrator (NFO) to relocate a workload from the identified O-Cloud node to alternative O-Cloud node based on the recommendation; and send an instruction to Infrastructure Management Services (IMS) to shutdown the identified O-Cloud node.

9. The system as claimed in claim 8, wherein the rApp is subscribed to O1 related data from Operations, Administration, Maintenance (OAM) and O2 related data from the FOCOM.

10. The system as claimed in claim 9, wherein the rApp uses a machine learning model based on collected data from the O1 related data and the O2 related data to generate the recommendation, and wherein the O1 related data and the O2 related data are related to traffic patterns and resource usage.

11. The system as claimed in claim 8, wherein upon receiving the instruction from the FOCOM to relocate the workload, the NFO is configured to check the availability of the alternative O-Cloud node, wherein:

if the NFO is able to find an alternative O-Cloud node, the NFO is configured to send an instruction to a Deployment Management Service (DMS) to migrate the workload; and if the NFO is unable to find an alternative O-Cloud node, the NFO is instead configured to send an error message to the FOCOM.

12. The system as claimed in claim 11, wherein upon receiving the instruction from the FOCOM to relocate the workload, the NFO is configured to send an instruction to Operations, Administration, Maintenance (OAM) to drain traffic from the identified O-Cloud node.

13. The system as claimed in claim 12, wherein the instruction to the IMS to shutdown the identified O-Cloud node is sent upon receiving confirmation from the NFO that the DMS has migrated the workload.

14. The system as claimed in claim 8, wherein the rApp, the FOCOM, and the NFO are each in communication with Service Management and Exposure (SME) and Data Management and Exposure (DME) to receive information related to at least one of services, endpoints, and supported data types.

15. A non-transitory computer-readable recording medium having recorded thereon instructions to perform a method comprising: receiving, by a Federated O-Cloud Orchestration and Management (FOCOM), a recommendation from an rApp to shutdown an identified O-Cloud node;

sending, by the FOCOM, an instruction to a Network Function Orchestrator (NFO) to relocate a workload from the identified O-Cloud node to alternative O-Cloud node based on the recommendation; and sending, by the FOCOM, an instruction to Infrastructure Management Services (IMS) to shutdown the identified O-Cloud node.

16. The non-transitory computer-readable recording medium as claimed in claim 15, wherein the rApp is subscribed to O1 related data from Operations, Administration, Maintenance (OAM) and O2 related data from the FOCOM.

17. The non-transitory computer-readable recording medium as claimed in claim 16, wherein the rApp uses a machine learning model based on collected data from the O1 related data and the O2 related data to generate the recommendation, and wherein the O1 related data and the O2 related data are related to traffic patterns and resource usage.

18. The non-transitory computer-readable recording medium as claimed in claim 15, wherein upon receiving the instruction from the FOCOM to relocate the workload, the NFO is configured to check the availability of the alternative O-Cloud node, wherein:

if the NFO is able to find an alternative O-Cloud node, the NFO is configured to send an instruction to a Deployment Management Service (DMS) to migrate the workload; and if the NFO is unable to find an alternative O-Cloud node, the NFO is instead configured to send an error message to the FOCOM.

19. The non-transitory computer-readable recording medium as claimed in claim 18, wherein upon receiving the instruction from the FOCOM to relocate the workload, the NFO is configured to send an instruction to Operations, Administration, Maintenance (OAM) to drain traffic from the identified O-Cloud node.

20. The non-transitory computer-readable recording medium as claimed in claim 19, wherein the instruction to the IMS to shutdown the identified O-Cloud node is sent upon receiving confirmation from the NFO that the DMS has migrated the workload.

* * * * *